(12) United States Patent
Gaidon (10) Patent No.: US 11,144,761 B2
(45) Date of Patent: Oct. 12, 2021

(54) DEEP DATA ASSOCIATION FOR ONLINE MULTI-CLASS MULTI-OBJECT TRACKING

(71) Applicant: Xerox Corporation, Norwalk, CT (US)

(72) Inventor: Adrien Gaidon, Genoble (FR)

(73) Assignee: XEROX CORPORATION, Norwalk, CT (US)

( * ) Notice: Subject to any disclaimer, the term of this patent is extended or adjusted under 35 U.S.C. 154(b) by 725 days.

(21) Appl. No.: 15/089,867

(22) Filed: Apr. 4, 2016

(65) Prior Publication Data
US 2017/0286774 A1 Oct. 5, 2017

(51) Int. Cl.
| | |
|---|---|
| G06K 9/00 | (2006.01) |
| G06T 7/254 | (2017.01) |
| G06T 7/246 | (2017.01) |
| G06K 9/46 | (2006.01) |
| G06K 9/62 | (2006.01) |
| G06K 9/78 | (2006.01) |
| G06N 3/04 | (2006.01) |
| G06N 3/08 | (2006.01) |
| G06T 3/00 | (2006.01) |
| G06T 7/20 | (2017.01) |

(52) U.S. Cl.
CPC ..... *G06K 9/00718* (2013.01); *G06K 9/00805* (2013.01); *G06K 9/4628* (2013.01); *G06K 9/6201* (2013.01); *G06K 9/6256* (2013.01); *G06K 9/6267* (2013.01); *G06K 9/78* (2013.01); *G06N 3/04* (2013.01); *G06N 3/08* (2013.01); *G06T 3/0087* (2013.01); *G06T 7/20* (2013.01); *G06T 7/248* (2017.01); *G06T 7/254* (2017.01); *G06T 2207/10016* (2013.01); *G06T 2207/20081* (2013.01); *G06T 2207/20084* (2013.01); *G06T 2207/30196* (2013.01); *G06T 2207/30236* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 7,227,893 B1 * | 6/2007 | Srinivasa | G06K 9/00771 348/155 |
| 2015/0104062 A1 * | 4/2015 | Huang | G06T 7/0081 382/103 |
| 2017/0193310 A1 * | 7/2017 | Yu | G06T 7/90 |

OTHER PUBLICATIONS

Krizhevsky, et al., "ImageNet Classification with Deep Convolutional Neural Networks", NIPS, 2012, 9 pgs.
(Continued)

*Primary Examiner* — Wei Wen Yang
(74) *Attorney, Agent, or Firm* — Fay Sharpe LLP (57) ABSTRACT

A system for applying video data to a neural network (NN) for online multi-class multi-object tracking includes a computer programed to perform an image classification method including the operations of receiving a video sequence; detecting candidate objects in each of a previous and a current video frame; transforming the previous and current video frames into a temporal difference input image; applying the temporal difference input image to a pre-trained neural network (NN) (or deep convolutional network) comprising an ordered sequence of layers; and based on a classification value received by the neural network, associating a pair of detected candidate objects in the previous and current frames as belonging to one of matching objects and different objects.

19 Claims, 7 Drawing Sheets

(56) References Cited

OTHER PUBLICATIONS

Geiger, et al., "Are We Ready for Autonomous Driving? The KITTI Vision Benchmark Suite", CVPR, 2012, 8 pgs.
Wang, et al., "Regionlets for Generic Object Detection", CVPR, 2013, 8 pgs.
Bernardin et al., "Evaluating Multiple Object Tracking Performance: The Clear MOT Metrics", in EURASIP Journal on Image and Video Processing, 2008, 10 pgs.

* cited by examiner

DEEP DATA ASSOCIATION FOR ONLINE MULTI-CLASS MULTI-OBJECT TRACKING

BACKGROUND

The present disclosure is directed to a system and a method for providing end-to-end learning of a spatio-temporal data association cost for online multi-object tracking by detection. The present disclosure is contemplated for deployment on embedded systems for traffic enforcement or management, but is also amenable to other computer vision tasks that detect and track multiple classes of objects.

The main paradigm for object tracking in monocular video streams is Tracking-By-Detection (TBD). In a first step, an object detector independently processes video frames, bounding regions which contain candidate objects of interest. In a second step, an association-based tracker performs pairwise matching between candidate objects in neighboring frames to track an object over time. However, tracking remains a challenge in crowded, cluttered scenes where there is no database used to label the detected objects. An existing data association algorithm can associate, or match, detections over time. One existing approach uses complex handcrafted features based, inter alia, on keypoint matching to compute pairwise costs. The features are assigned some form of weighting of importance. For example, they can be used to weight edges of a fully connected bi-partite graph connecting all detections between adjacent frames. The association algorithm, such as the Hungarian matching algorithm, then determines the probability that the two candidate object detections are associated with the same object.

In contrast to existing approaches that use hand-crafted features, an end-to-end algorithm is desired to learn a category-agnostic pairwise cost function, which is specifically tailored for online multi-object tracking in videos. A cost function is desired which can rely on the recent progress of deep learning and, in particular, convolutional neural networks ("deep convolutional network", "CNNs", "NNs" or "ConvNets").

In the existing CNN, convolving of an input image generates a stack of filtered images that are fed as layers into the neural network. The output from each layer undergoes additional convolutions to output a set of filtered images (known as a "tensor"), which are unfolded into a feature vector used to predict a label associated with the original input image.

The input image applied to a conventional CNN is represented by three dimensions. However, CNNs are not practical in the case of video data because the video is represented by an additional time dimension (i.e., height× weight×3×duration), which causes scalability issues, in particular for long videos.

Accordingly, there is a desire to transform a video sequence into a single input image that can be applied to a neural network having architecture and weights trained to predict a label associated with the original input video.

INCORPORATION BY REFERENCE

A. Krizhevsky, I. Sutskever, and G. Hinton, "ImageNet Classification with Deep Convolutional Neural Networks", NIPS, 2012, the contents of which are fully incorporated herein.

A. Geiger, P. Lenz, and R. Urtasun, "Are we ready for autonomous driving? The KITTI vision benchmark suite", CVPR, 2012, the contents of which are fully incorporated herein.

X. Wang, M. Yang, S. Zhu, and Y. Lin, "Regionlets for generic object detection", CVPR, 2013, the contents of which are fully incorporated herein.

BRIEF DESCRIPTION

One embodiment of the present disclosure is directed to a system for applying video data to a neural network (NN) for online multi-class multi-object tracking. The system comprises a computer programed to perform a method for a classification of candidate object associations and including the operations of receiving video frames from a video sequence; detecting candidate objects in each of a previous and a current video frame; transforming the previous and current video frames into a temporal difference input image; applying the temporal difference input image to a pre-trained neural network (NN) comprising an ordered sequence of layers; and based on a classification value received by the neural network, associating a pair of detected candidate objects in the previous and current frames as belonging to one of matching objects and different objects.

Another embodiment of the present disclosure is directed to a non-transitory storage medium storing instructions readable and executable by a computer to perform a tracking method including the operations of (a) detecting candidate objects in each of a previous and a current video frame; (b) transforming the previous and current video frames into a temporal difference input image; (c) applying the temporal difference input image to a pre-trained neural network (NN) comprising an ordered sequence of layers; and (d) based on a classification value received by the neural network, associating a pair of detected candidate objects in the previous and current frames as belonging to one of matching objects and different objects.

DETAILED DESCRIPTION

The present disclosure is directed to a system and a method for providing end-to-end learning of a spatio-temporal data association cost for online multi-object tracking by detection. The disclosure learns a probability of matching two detections in current and previous (s.a., adjacent) frames from raw pixels using a deep convolutional neural network on local spatially-aligned temporal differences.

As used herein, the term "Multi-Object Tracking" ("MOT") refers to the automatic detection and tracking of multiple objects of a known category in videos.

As used herein, the term "category-agnostic" means that the disclosed neural network is not limiting to a particular class of objects. The CNN can be trained on ground truth pairwise associations irrespective of the object class, and is applicable in the multi-class multi-object setting.

Figure 1:
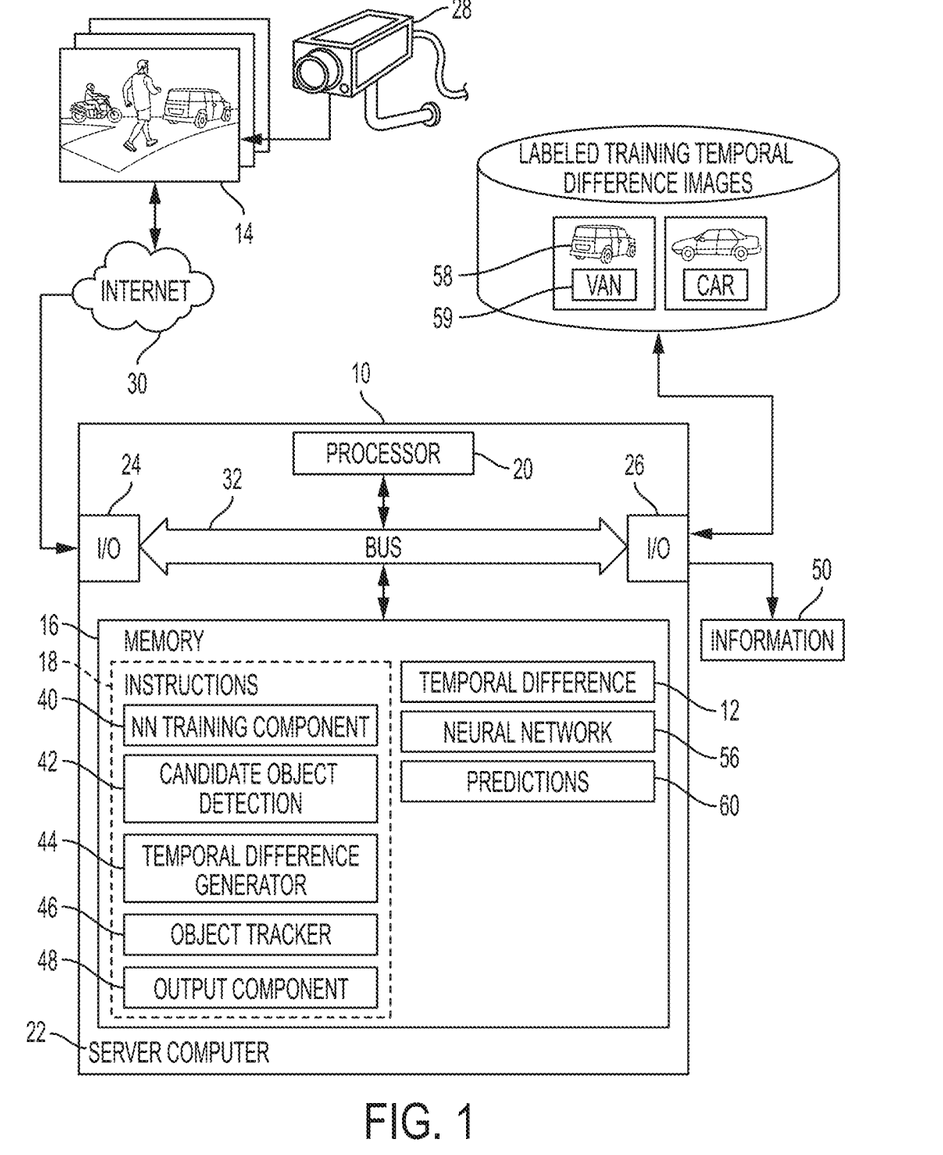
FIG. 1 is a schematic showing a computer-implemented system for providing end-to-end learning of a spatio-temporal data association cost for online multi-object tracking by detection.

With reference to FIG. 1, a computer-implemented system 10 for generating temporal differences 12 of an input object, such as video 14, is shown. The system 10 includes memory 16 which stores instructions 18 for performing the method illustrated in FIG. 2 and a processor 20 in communication with the memory for executing the instructions. The system 10 may include one or more computing devices 22, such as the illustrated server computer. One or more input/output devices 24, 26 allow the system to communicate with external devices, such as a video capture device 28, or other source of an image, via wired or wireless links 30, such as a LAN or WAN, such as the Internet. The video capture device 28 may include a video camera, which supplies the video 14, such as frames of a video sequence, to the system 10 for processing. Hardware components 16, 20, 24, 26 of the system communicate via a data/control bus 32.

The illustrated instructions 18 include a neural network training component 40, an object detector 42, a temporal difference generator 44, an object tracker 46, and an output component 48.

The NN training component 40 trains the neural network 56, such as a ConvNet. The neural network includes an ordered sequence of supervised operations (i.e., layers) that are learned on a set of labeled training objects 58, such as images and their true labels 59. In an illustrative embodiment, where the input video 14 includes a vehicle, the set of labeled training images 58 comprises a database of images of intended objects each labeled to indicate a type using a labeling scheme of interest (such as class labels corresponding to the object of interest). Fine-grained labels or broader class labels are contemplated. The supervised layers of the neural network 56 are trained on the training images 58 and their labels 59 to generate a prediction 60 (e.g., in the form of class probabilities) for a new, unlabeled video, such as video 14. In some embodiments, the neural network 56 may have already been pre-trained for this task and thus the training component 40 can be omitted.

The object detector 42 detects candidate objects in each of a previous and a current video frame. A temporal difference generator 44 transforms the previous and current video frames into a temporal difference input image. As stated, supra, the neural network 60 outputs a prediction regarding whether the objects detected in the frames match. An object tracker 46 links the matching objects between the previous and current frames and tracks a location of the matching objects across the video.

The output component 48 outputs information 50, such as the temporal difference 12 of the video 14, a label (or label probabilities) for the video, output by the object tracker 48, and/or other information based thereon.

The computer system 10 may include one or more computing devices 22, such as a PC, such as a desktop, a laptop, palmtop computer, portable digital assistant (PDA), server computer, cellular telephone, tablet computer, pager, video capture device, such as camera 28, combinations thereof, or other computing device capable of executing the instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of a random access memory and read only memory. In some embodiments, the processor 20 and memory 16 may be combined in a single chip. Memory 16 stores instructions for performing the exemplary method as well as the processed data 12, 60.

The network interface 24, 26 allows the computer to communicate with other devices via a computer network, such as a local area network (LAN) or wide area network (WAN), or the internet, and may comprise a modulator/demodulator (MODEM), a router, a cable, and/or Ethernet port.

The digital processor device 20 can be variously embodied, such as by a single-core processor, a dual-core processor (or more generally by a multiple-core processor), a digital processor and cooperating math coprocessor, a digital controller, or the like. The digital processor 20, in addition to executing instructions 18 may also control the operation of the computer 22.

The term "software," as used herein, is intended to encompass any collection or set of instructions executable by a computer or other digital system so a to configure the computer or other digital system to perform he task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
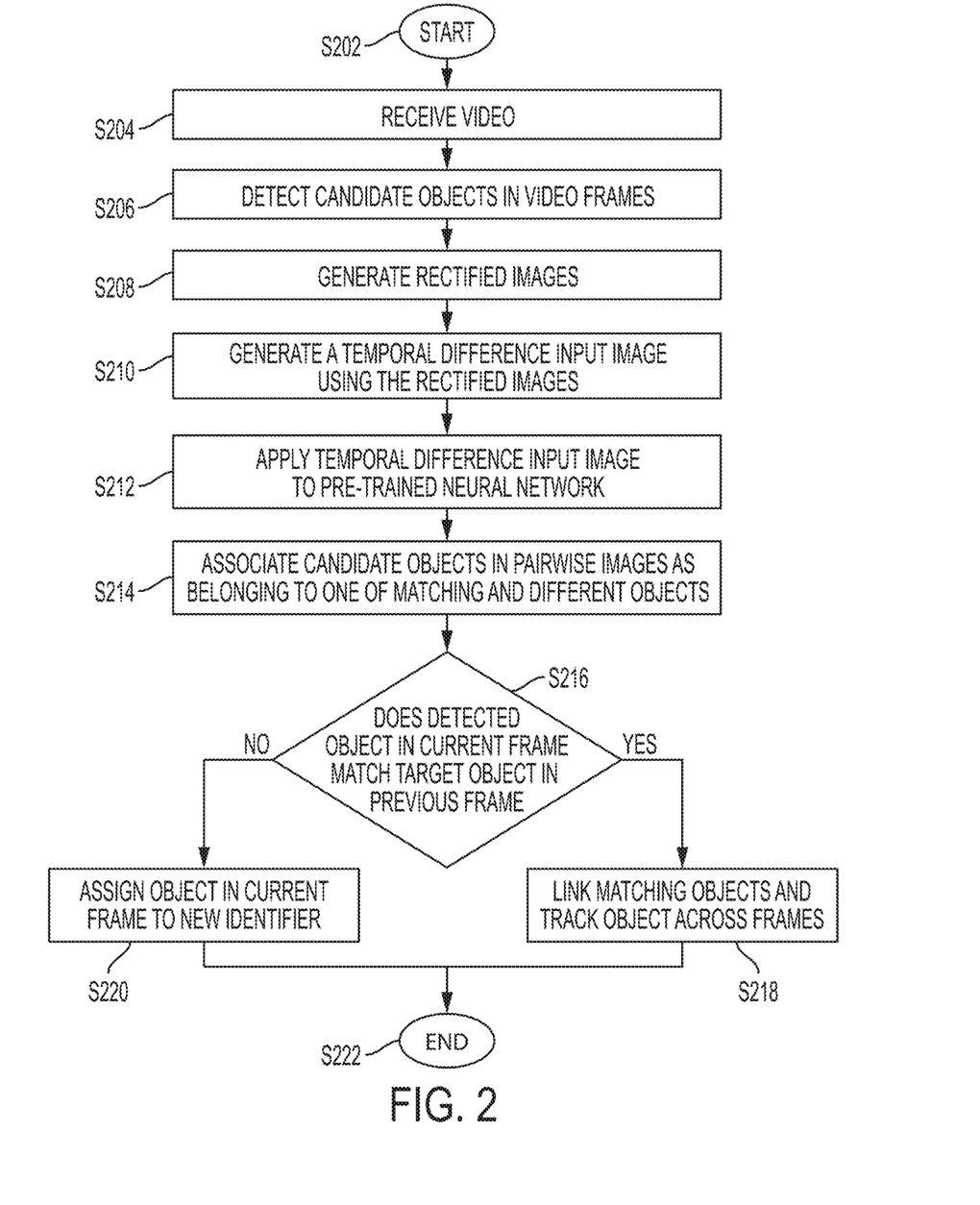
FIG. 2 illustrates an exemplary method 200 which may be performed with the system of FIG. 1.

FIG. 2 illustrates an exemplary method 200 which may be performed with the system of FIG. 1. The method begins at S202. At S204, the system receives video data from the video camera 28. Generally, the video data can include video frames from an online or offline video sequence. In the contemplated embodiment, the system can process every frame (i.e., adjacent frames) or every $n^{th}$ frame (i.e., temporally distant frames) based on a predetermined number n. At S206, the object detector 42 independently processes each video frame to detect candidate objects located within a scene of interest. Particularly, the detector 42 draws virtual bounding boxes around regions which it estimates contains an object of interest. Any known approach can be used to perform the tracking by detection. There is no limitation made herein. Furthermore, the detector 42 is contemplated to detect candidate objects from multiple classes in any one video frame. One aim of the disclosure is to track an object across the sequence of frames. Therefore, the system must determine the matching objects between two video frames so that the objects can be linked across time. To achieve this function, the disclosure provides a pairwise matching process that associates between objects that are currently being tracked and candidate new objects detected in a new video frame. To make this decision, i.e., to output a prediction regarding whether the objects detected in two different frames are the same ("matching") or different, the disclosure performs the association based on deep learning. Particularly, the system learns a pairwise matching function that is prioritized by a deep network. However, as discussed, supra, a conventional neural network is suboptimal for video data processing. Accordingly, the video data must be first transformed into a different type of input.

The temporal difference generator 44 transforms the video data into type of input that works on conventional neural networks. Particularly, the temporal difference generator 44 transforms two video frames into a temporal difference input image. In the contemplated embodiment, the video frames can be adjacent frames. Or, in the case where the system operates on every $n^{th}$ frame, the video frames can include a current frame and a temporally distant previous frame. Any known approach can be applied to the video frames to generate the temporal difference input image. In one embodiment, a background subtraction can be used.

First, the temporal difference generator 44 generates a rectified images at S208. Particularly, for each pair of the candidate objects detected in the previous and current frames, the generator 44 spatially aligns the bounding boxes bounding each pair of the detected candidate objects. Then, the generator 44 reshapes a pair of bounding boxes to a predetermined n×n number of pixels, i.e., to a fixed dimensionality. The rectified input images each include an aligned and reshaped bounding box, irrespective of the initial location of the box on the image plane.

Figure 3A:
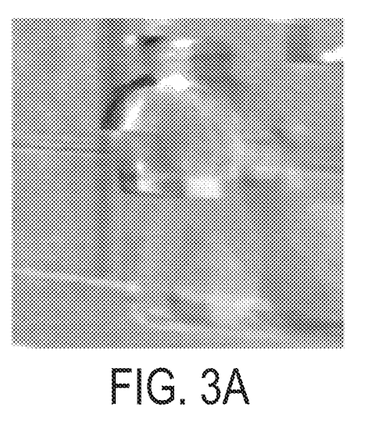
FIGS. 3A-3B are illustrative examples of spatially-aligned temporal differences of matching object features.
Figure 3B:
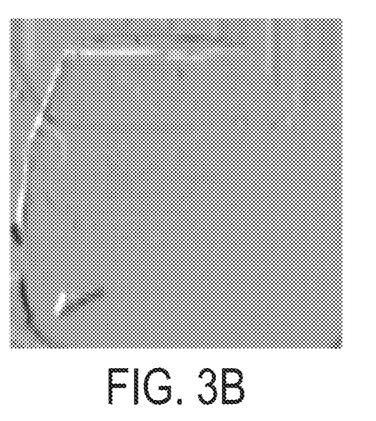

Next, the generator 44 replaces the rectified images with a temporal difference input image at S210. Because the disclosure contemplates that matching objects have different locations in the two frames—i.e., because the object is a moving object—a motion boundary becomes visible in the temporal difference input image. Motion boundaries, as used herein, are edges that move in a non-translational fashion and characterize motion patterns. They represent the appearance variation in time. FIGS. 3A-3B are illustrative examples of temporal difference images of matching object features.

Figure 3C:
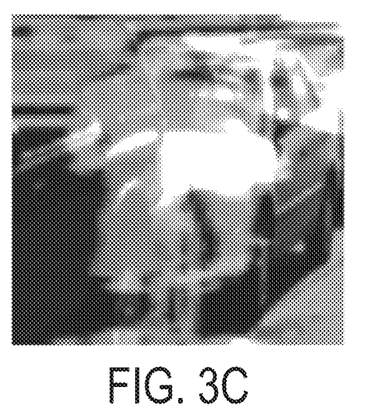
FIGS. 3C-3D are illustrative examples of spatially-aligned temporal differences of different object features.
Figure 3D:
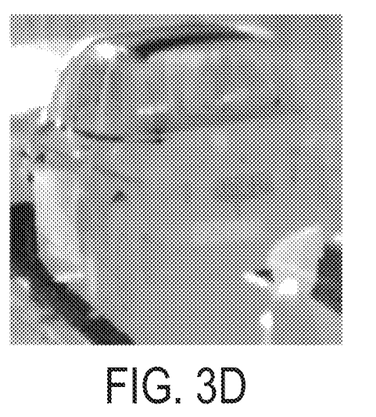
Figure 4A:
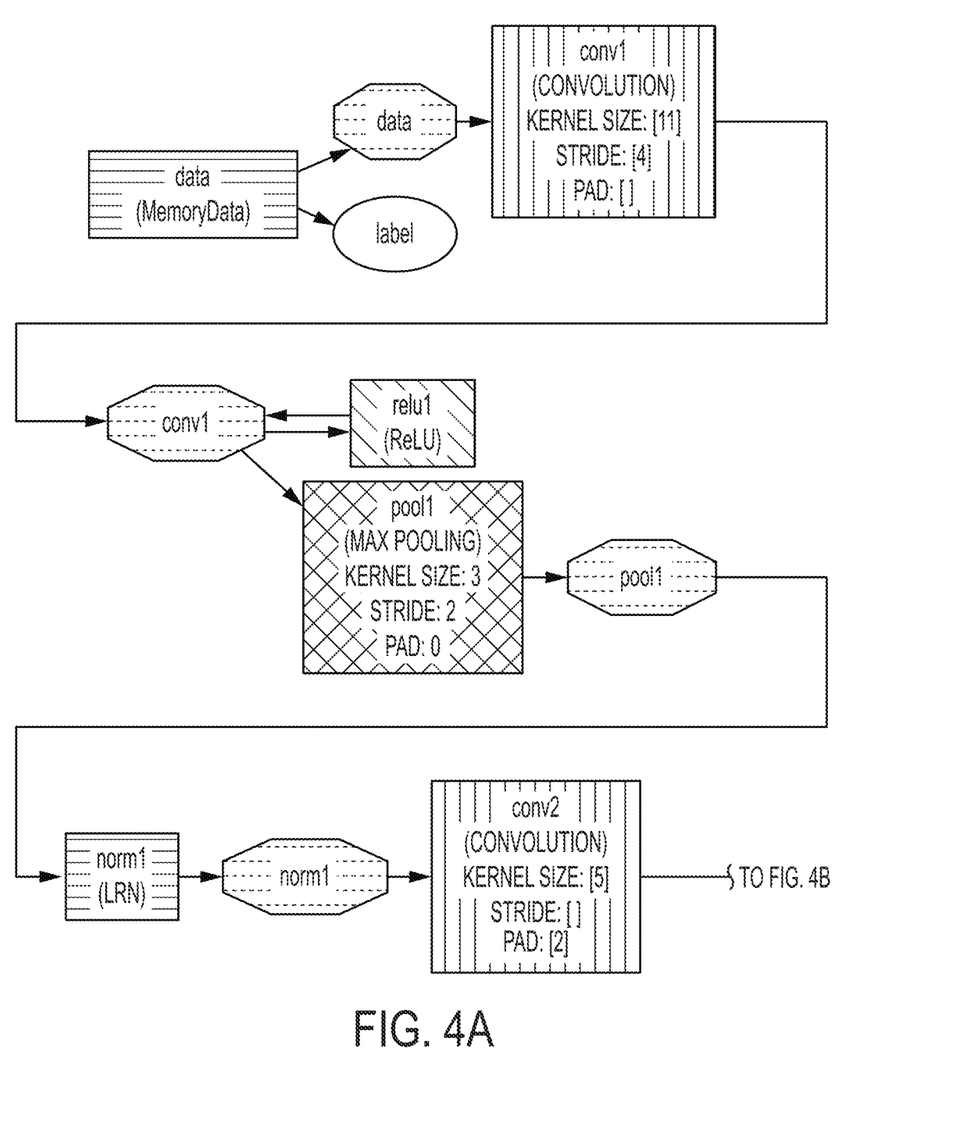
FIGS. 4A-4D depicts an architecture of a pairwise cost function that is parametrized as a deep neural network.
Figure 4B:
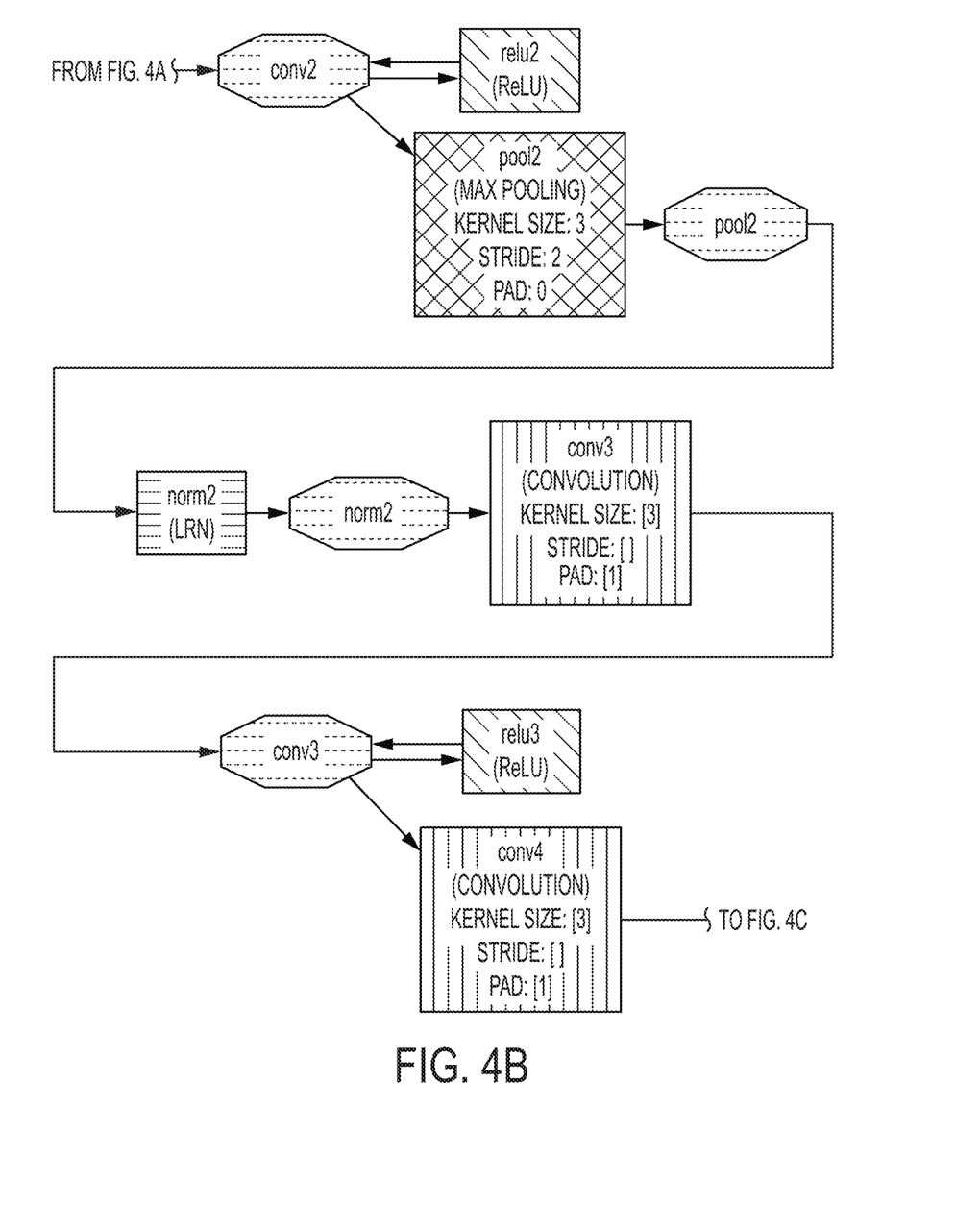
Figure 4C:
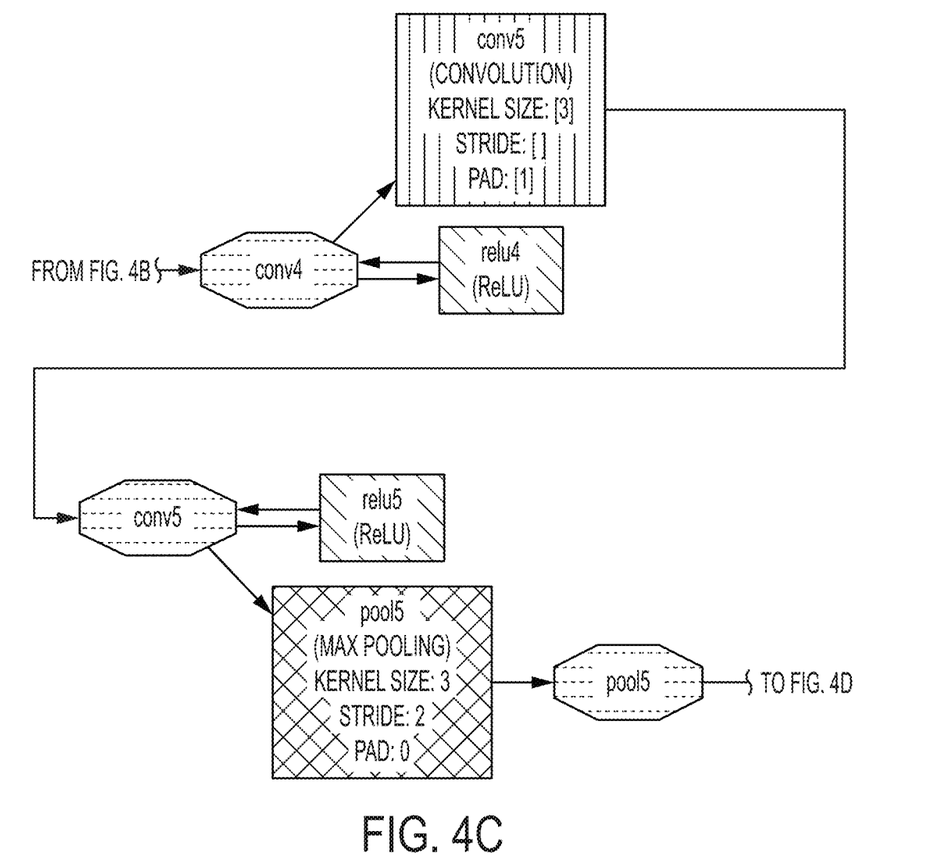
Figure 4D:
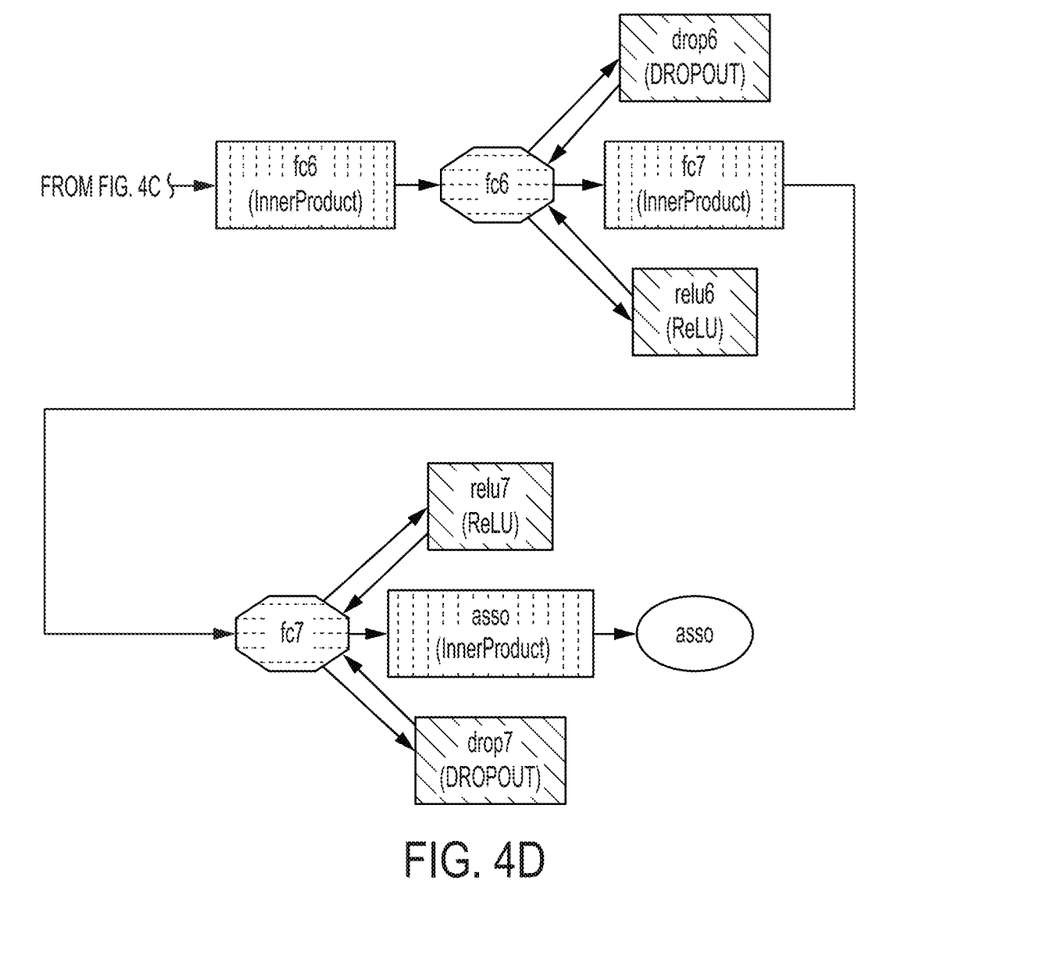

FIGS. 3C-3D are illustrative examples of temporal difference images of different, or non-matching, object features.

Returning to FIG. 2, by transforming the bounding boxes of different frames into a temporal difference input image, the disclosure enables the system to treat videos as images that can be applied to a neural network.

At S212, the system applies the temporal difference input image to a pre-trained neural network (NN) 56 comprising an ordered sequence of layers. Based on a classification value generated by the neural network, the neural network associates the pair of detected candidate objects in the previous and current frames as belonging to one of matching objects and different objects at S214.

In other words, the neural network 56 takes the candidate objects—which can be associated with a target object being tracked in a given previous frame and a new or existing object in a current frame—and creates a data association matrix—a number of targets by a number of detections. The neural network 56 generates a probability ("association score") in each cell of the matrix corresponding that the detected object in the current frame matches the target object in the previous frame. The association scores are then applied to a Hungarian matching algorithm, or an equivalent algorithm, which makes a final decision ("prediction 60") regarding whether or not the target and detected objects belong to a matching object. The neural network then outputs a label regarding the prediction 60—which in the illustrative embodiment relates to the task of matching objects.

In response to the prediction indicating that the objects belong to matching objects (YES at S216), the object tracker 46 links the matching objects between the previous and current frames of which the bounding boxes were extracted from at S218. The object in the current frame maintains its identity assigned to it in a previous frame. The object tracker 46 tracks a location of the object across the video sequence at S218. In response to the prediction indicating that the objects do not match (NO at S216), the object tracker 46 associates the object in the current frame as belonging to a new object and assigns the new object an identity at S220. The method ends at S222.

The method described in FIG. 2 uses a neural network that has been pre-trained to predict labels for the temporal difference input image, where the training has been performed with a set of labeled training images. As mentioned, supra, the disclosed system performs a pairwise matching function that is prioritized by a deep neural network. However, conventional deep architectures rely on large labeled training sets. One aspect of the presently disclosed deep learning approach is that it can easily generate a sufficient volume of labelled samples (of matching and non-matching pairs of detections) and training sets, making the neural network easy to train.

Generally, for each set of pairwise training images, the NN training component 40 generates a training temporal difference image representing a training image by the same operations that generate a motion boundary representing the temporal difference input image in FIG. 2. Next, the NN training component 40 trains the neural network (NN) on a training set comprising the generated training temporal difference input images annotated by labels of the represented training images. The set of training images comprise a set of training images of objects, the labels of the training images are labels of matching objects captured in the pairwise image frames, and the classification value for the temporal difference input image that is generated by the neural network is effective to classify the objects detected in a pair of video frames as belonging to one of matching objects and different objects.

In more detail, the NN training component 40 trains the neural network (NN) to learn a stack of filters in each of the layers of the neural network. By "learning", the NN training component 40 finds weights that minimize errors according to the task, which can include a binary classification task defined in the illustrative embodiment as matching objects irrespective of class. The NN training component 40 generates an initial prediction for an initial value of weights. Example (training/sample) pairs of matching images and nonmatching images and corresponding labels are fed through the neural network 56, which generates a weight ("score") for each pair. A back propagation algorithm nudges the weights to reduce error. These weights become fixed so that the trained neural network can automatically predict the labels.

In summary, the neural network training component 40 learns the features that characterize the motion boundaries in the training images. In practice, a temporal difference input image contains enough information for the trained neural network 12 to make a match prediction. In other words, given the two bounding boxes extracted from pairwise images, the system can output a probability regarding whether the candidate objects in the bounding boxes belong to the same object. This type of learning can benefit from a simple generation of many labelled training examples by sampling pairs of matching and non-matching detections.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 22, (for example, an internal hard drive of RAM), or may be separate (for example, an external hard drive operatively connected with the computer 20), or may be separate and accessed via a digital data network such as a local area network (LAN) or the Internet (for example, as a redundant array of inexpensive or independent disks (RAID) or other network server storage that is indirectly accessed by the computer 22, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may be computer implemented, in some embodiments one or more of the steps may be at least partially performed manually. As will also be appreciated, the steps of the method need not all proceed in the order illustrated and fewer, more, or different steps may be performed.

Further details on the system and method will now be provided.

1. Deep ConvNet for Temporal Data Association in the Context of MOT

The present disclosure provides a pairwise cost function that is parametrized as a deep convolutional network ("neural network") having an architecture depicted in FIGS. 4A-4D. The architecture is based on the seminal AlexNet disclosed by A. Krizhevsky, I. Sutskever, and G. Hinton in "ImageNet Classification with Deep Convolutional Neural Networks", NIPS, 2012, the contents of which are fully incorporated herein. However, the architecture is modified to receive as data input, and process, pairs of candidate object detections (bounding boxes) in adjacent frames instead of single images, and its task is to predict pairwise matching costs instead of image-level object labels. The bounding box of each pair is spatially aligned and all pairs are shaped to 227×227 pixels. Each detection pair is replaced with a corresponding temporal difference between aligned and reshaped bounding boxes. Mean-centering temporal differences using the mean local temporal difference are estimated on the training data.

The main motivation behind using temporal differences is to leverage the spatio-temporal structure, as evidenced by FIGS. 3A-3D. The temporal difference input images yield significant recognition performance improvements as compared to processing pairs individually or the concatenating image regions. The neural network disclosed herein learns a spatio-temporal association function based on local motion and deformations, both of the object-of-interest and of its surrounding context. As illustrated in FIGS. 3A-3D, temporal differences particularly underline motion boundaries, which are at the heart of state-of-the-art action recognition methods. The EXAMPLES disclosed, infra, evidence that motion boundaries are also useful for multi-object tracking.

The architecture is also modified to use a binary classification predictor with a soft-max loss in order to compute matching probabilities. At inference time (during online tracking), the probability of non-match as pairwise cost can be used in the Hungarian matching algorithm tracking-by-detection described, infra.

2. End-to-end Learning for Deep Data Association

The main barrier of representation learning for videos lies in their high annotation cost. Deep learning architectures involve a lot of parameters and therefore require many labeled training examples. However, such is not the case with the present disclosure because standard multi-object training benchmarks, such as KITTI, provide enough training data to learn a useful pairwise cost function, as many samples of matching/non-matching object pairs can be used as training examples. The cost function is learned in an end-to-end fashion using training pairwise matches.

First, the system learns from pairs of bounding boxes. The KITTI training ground truth tracks—without any data augmentation—provides approximately 100K training samples when down-sampling the negative sample pairs to yield the same number as all possible positive ones. This can be further increased by using either jittering, allowing for time-skips, or replacing ground truth annotations by strongly-overlapping detections (or even object proposals). These data augmentation strategies are contemplated to boost recognition performance further, or at least contribute to or prevent over-fitting.

Second, the disclosed model, although end-to-end, already benefits from a strong prior that gives it a head-start, and in practice diminishes the dependency on the quantity of training data. As explained, supra, in the case of multi-object tracking, the disclosed system can leverage the spatio-temporal structure by using spatially-aligned temporal differences highlighting the important motion boundaries. When using other architectures (s.a., e.g., Siamese or region concatenation), this prior is absent and has to be inferred from (potentially large amounts of) data.

Third, using spatially-aligned temporal differences also simplifies the learning problem. As visible in FIGS. 3A-3D, even in the presence of camera and background motion or large object displacement, differences between temporally-adjacent detections are generally sparser than detections that do not belong to the same track, irrespective of the object category. Therefore, the local spatio-temporal patterns to recognize are simpler, and thus are likely to require less training data.

The parameters of the disclosed neural network can be learned from scratch on training videos labeled with ground truth tracks using standard stochastic gradient descent with momentum and the hyper-parameters disclosed by A. Krizhevsky, et al., in "ImageNet Classification with Deep Convolutional Neural Networks", previously incorporated by reference herein. In practice, existing small training sets, such as the 8000 training frames of the KITTI MOT benchmark disclosed by A. Geiger, P. Lenz, and R. Urtasun in "Are we ready for autonomous driving? The KITTI vision benchmark suite", CVPR, 2012, the contents of which are fully incorporated herein, are sufficient to learn a useful deep data association function, with convergence obtained after less than one epoch.

3. Online Multi-Class MOT

The disclosed pairwise cost function can be used in conjunction with the Hungarian algorithm for simple and fast multi-class multi-object tracking.

At tracking time, frames are processed one-by-one (online MOT) by first running a pre-trained multi-class object detector, such as the detector disclosed by X. Wang, M. Yang, S. Zhu, and Y. Lin in "Regionlets for generic object detection" in CVPR, 2013, the contents of which are fully incorporated herein. A matrix of pair-wise costs is next computed between all targets in the previous frame and all candidate detections in the current frame by computing the probability for each pair to be a non-match, as estimated by a feed-forward pass of the deep neural network disclosed, supra. This matrix can approximate 100×100 cells, to improve the computation speed. The cost matrix is then used with the Hungarian algorithm to efficiently obtain the optimal association from targets to detections. The targets that do not have a match (i.e., end of the track) are terminated. A new object track is initialized if a detection was not matched to a previous target.

Although the control method is illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

One aspect of the present disclosure is a fully automatic end-to-end learning approach that can be used with video data for multi-object tracking.

Another aspect of the present disclosure is a deep learning neural network that can use video frames as input. The present system can outperform existing neural networks that use extracted handcrafted features. The system and method disclosed herein improves multi-object tracking results with a much simpler and fast end-to-end pipeline.

Another aspect of the present disclosure is a more efficient deep architecture that is scalable. The architecture can process around 100k detection pairs per second, which allows it to run tracking-by-detection with Hungarian matching in real-time (30 FPS) on the KITTI MOT benchmark.

Another aspect of the presently disclosed deep learning approach is that it can easily train, which is typically challenging when deep learning on videos. The presently disclosed system can generate many labeled training samples and create large labeled training sets to easily train the neural network.

EXAMPLE

Multi-object tracking performance was evaluated on a publicly-available KITTI tracking challenge disclosed by A. Geiger, P. Lenz, and R. Urtasun in "Are we ready for autonomous driving? The KITTI vision benchmark suite", CVPR, 2012. Videos were recorded from a moving platform while driving in and around a city-of-interest. The dataset was designed to investigate how computer vision algorithms perform on real-world data typically found in robotics and autonomous driving applications. These sequences had a high resolution of 1242×375, and varied significantly in terms of number of frames, number of objects, camera motion, and imaging conditions. Training videos (8000 frames) were used to learn our models. The ground truth tracks of the test videos are not publicly available. Therefore, the evaluation was conducted by uploading result tracks on the KITTI challenge evaluation server, which did not allow for repeated submissions within 72 hours. Public regionlets detections, disclosed by X. Wang, M. Yang, S. Zhu, and Y. Lin in "Regionlets for generic object detection" in CVPR, 2013 and provided by the benchmark organizers, were used.

The KITTI evaluation protocol was followed by using the CLEAR MOT metrics disclosed by K. Bernardin and R. Stiefelhagen in "Evaluating Multiple Object Tracking Performance: The Clear MOT Metrics" in *EURASIP Journal on Image and Video Processing*, 2008—including the MOT Accuracy (MOTA, composed of the false positive and negative rates, as well as the number of identity switches), MOT Precision (MOTP), Fragmentation (FRAG), and IDentity Switches (IDS)—complemented by the Mostly Tracked (MT) and Mostly Lost (ML) ratios, as well as Precision (P), Recall (R), and False Alarm Rate (FAR).

Regarding the KITTI MOT benchmark Results, the quantitative results for the method (DDA for Deep Data Association) and all the published online MOT methods, as given by the KITTI leaderboard[2], are shown in Table 1.

TABLE 1

| method | MOTA↑ | MOTP↑ | MT↑ | ML↓ | Rec.↑ | Prec.↑ | FAR↓ | IDS↓ | FRG↓ |
|---|---|---|---|---|---|---|---|---|---|
| HM | 42.22% | 78.42% | 7.77% | 41.92% | 43.83% | 96.80% | 4.54% | 12 | 577 |
| RMOT | 49.87% | 75.33% | 15.24% | 33.54% | 56.39% | 90.16% | 19.35% | 51 | 385 |
| RMOT* | 60.46% | 75.57% | 26.98% | 11.13% | 79.19% | 82.68% | 54.02% | 216 | 742 |
| ODAMOT | 57.06% | 75.45% | 16.77% | 18.75% | 64.76% | 92.04% | 17.93% | 404 | 1304 |
| NOMT-HM | 58.30% | 78.79% | 26.98% | 30.18% | 63.03% | 94.07% | 12.65% | 28 | 251 |
| NOMT-HM* | 69.86% | 80.10% | 38.72% | 15.09% | 79.55% | 90.78% | 26.44% | 109 | 372 |
| DDA* | 60.22% | 79.15% | 27.44% | 11.89% | 74.96% | 90.00% | 27.32% | 1670 | 2334 |

The disclosed method obtained 60.2% MOTA performance. It ranked third among online multi-object tracking methods, only −0.24% below the second best RMOT*, but −9% below the very recent NOMT-HM* method, both of which are much more complicated and involve the tuning of several hyper-parameters of their hand-crafted features and trackers. On the other hand, the disclosed method vastly outperforms the HM baseline of the KITTI benchmark (+18%) that relies on handcrafted features (bounding box overlap and color histograms). The disclosed method also improves over our previous patented and published ODA-MOT tracker by +3%.

The disclosed DDA tracker is among the best in terms of support of tracked targets (as attested by a high MT and a ML metric among the lowest), but is suffering from a large number of identity switches and fragmentation of tracks compared to other approaches. This is because the approach does not use any target-specific appearance or motion model, which are complementary to the disclosed learned pairwise cost function based on instantaneous local spatio-temporal pattern classification. Integrating target appearance and motion is out of the scope of this disclosure, but is straightforward and likely to vastly decrease IDS and FRAG, which in turn would impact all other metrics, especially MOTA.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for applying video data to a neural network (NN) for online multi-class multi-object tracking, the system comprising:
   a computer programed to perform a method for a classification of candidate object associations and including the operations of:
      receiving video frames from a video sequence;
      detecting candidate objects in each of a previous and a current video frame;
      transforming the previous and current video frames into a spatially-aligned temporal difference input image highlighting motion boundaries;
      applying the spatially-aligned temporal difference input image to a pre-trained neural network (NN) comprising an ordered sequence of layers; and
      based on a classification value received by the neural network, associating a pair of detected candidate objects in the previous and current frames as belonging to one of matching objects and different objects.

2. The system of claim 1 wherein the computer is further programmed to perform the operation of the transforming by:
   for each pair of the candidate objects detected in the previous and current frames, spatially align bounding boxes bounding the each pair of the detected candidate objects;
   reshaping the pair of bounding boxes to a predetermined n×n number of pixels to generate a pair of rectified input images; and
   generating the temporal difference input image using the pair of rectified input images.

3. The system of claim 1 wherein the computer is further programmed to perform the operation of:
   linking the matching objects between the previous and current frames; and
   tracking a location of the matching objects across the video sequence.

4. The system of claim 1 wherein the temporal difference input image corresponding to a pair of matching objects in the previous and current frames represents a motion boundary.

5. The system of claim 1 wherein the current and previous frames are adjacent frames.

6. The system of claim 1 wherein the neural network is not limiting to a particular class of objects.

7. The system of claim 1, wherein the neural network has been pre-trained to predict labels for an image, the training having been performed with a set of labeled training images.

8. The system of claim 1 wherein the computer is further programmed to perform a neural network training method comprising the operations of:
   for each set of pairwise training images, generating a training temporal difference input image representing a training sample by the same operations that generate the temporal difference input image; and
   training the neural network (NN) on a training set comprising the generated training temporal difference input images annotated by labels of the represented training samples.

9. The system of claim 8 wherein the set of training samples comprise a set of training images of objects, the labels of the training samples are labels of matching and non-matching objects captured in the pairwise image frames, and the classification value for the temporal difference input image that is generated by the neural network is effective to classify the objects detected in a pair of video frames as belonging to one of matching objects and different objects.

10. The system of claim 1 comprising:
   a memory which stores the pre-trained neural network;
   a candidate object detection component for detecting the candidate objects;
   a prediction component for predicting labels for the temporal difference input image using a forward pass of the neural network; and
   a processor in communication with the memory for implementing the prediction component.

11. The system of claim 1 further comprising:
   a video camera arranged to acquire the video frames as image of objects to be matched and tracked across the video sequence.

12. A non-transitory storage medium storing instructions readable and executable by a computer to perform a tracking method including the operations of:
   (a) detecting candidate objects in each of a previous and a current video frame;
   (b) transforming the previous and current video frames into a spatially-aligned temporal difference input image highlighting motion boundaries;
   (c) applying the temporal difference input image to a pre-trained neural network (NN) comprising an ordered sequence of layers; and
   (d) based on a classification value received by the neural network, associating a pair of detected candidate objects in the previous and current frames as belonging to one of matching objects and different objects.

13. The non-transitory storage medium of claim 12 wherein the transforming operation (b) comprises:
   for each pair of the candidate objects detected in the previous and current frames, spatially align bounding boxes bounding the each pair of the detected candidate objects;
   reshaping the pair of bounding boxes to a predetermined n×n number of pixels to generate a pair of rectified images;
   generating the temporal difference input image using the pair of rectified images.

14. The non-transitory storage medium of claim 12 further performing the operations of:
- linking the matching objects between the previous and current frames; and
- tracking a location of the matching objects across the video sequence.

15. The non-transitory storage medium of claim 12 wherein the temporal difference input image corresponding to a pair of matching objects in the previous and current frames represents a motion boundary.

16. The non-transitory storage medium of claim 12 wherein the current and previous frames are adjacent frames.

17. The non-transitory storage medium of claim 12 wherein the neural network is not limiting to a particular class of objects.

18. The non-transitory storage medium of claim 12 wherein the neural network has been pre-trained to predict labels for an image, the training having been performed with a set of labeled training images.

19. The non-transitory storage medium of claim 12 further performing the operation of training the neural network including the operations of:
- for each set of pairwise training images, generating a training temporal difference input image representing a training sample by the same operations that generate the temporal difference input image; and
- training the neural network (NN) on a training set comprising the generated training temporal difference input images annotated by labels of the represented training samples.

* * * * *